No. 698,692.
Patented Apr. 29, 1902.
T. DUNCAN.
ELECTRICAL MEASURING INSTRUMENT.
(Application filed Mar. 10, 1900.)
(No Model.)
2 Sheets—Sheet I.
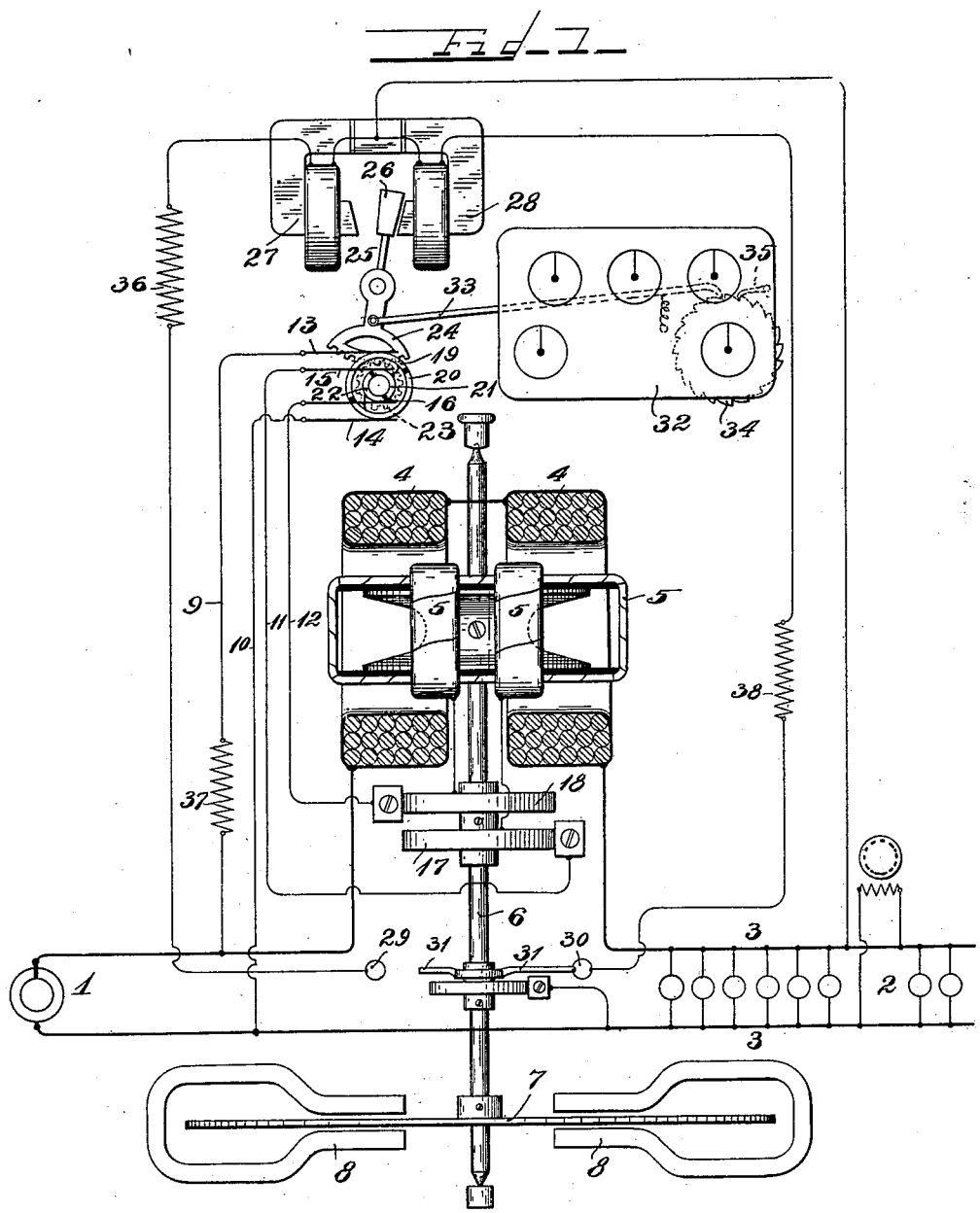
Witnesses
Inventor
Thomas Duncan
By Charles A. Brown & Gregg
Attorneys No. 698,692. Patented Apr. 29, 1902.
T. DUNCAN.
ELECTRICAL MEASURING INSTRUMENT.
(Application filed Mar. 10, 1900.)
(No Model.) 2 Sheets—Sheet 2.
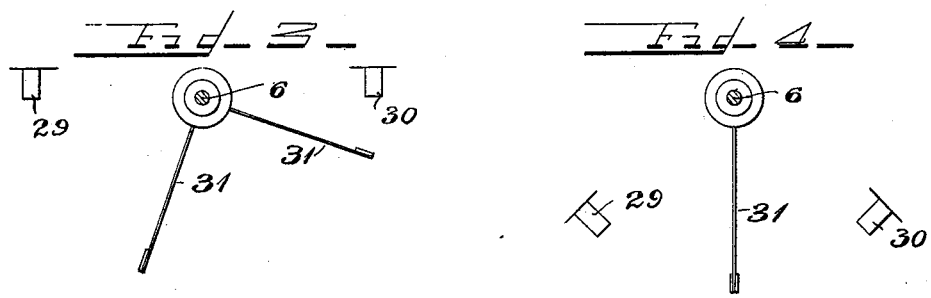
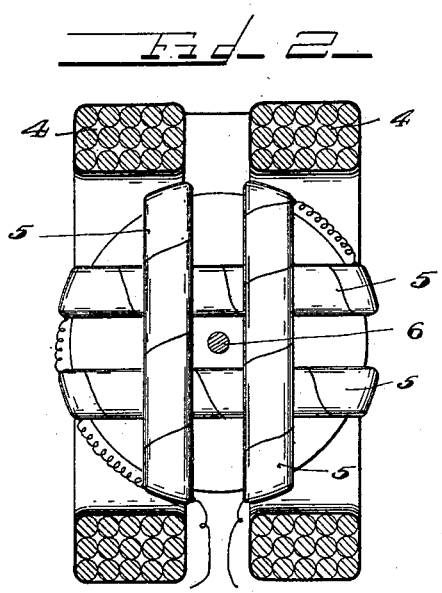
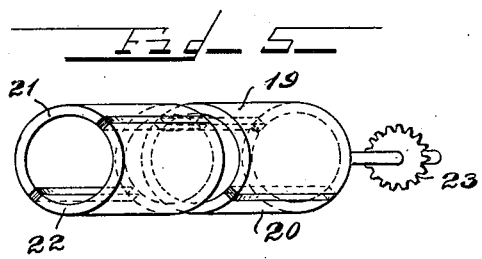
Witnesses
Max W. Label.
Chas J. Schmitt.
Inventor
Thomas Duncan
BY Charles A. Brown & Cragg
Attorneys

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,692, dated April 29, 1902.

Application filed March 10, 1900. Serial No. 8,192. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 363,) of which the following is a full, clear, concise, and exact description, reference being had to the accompanying drawings, forming a part of this specification.

My invention relates to oscillating motor-meters, and has for its object the provision of improved details of construction thereof and improved means for governing the circuits of the meter to effect proper measurement of electricity.

One feature of my invention comprises a reversing-switch for changing the direction of current of a meter-winding and improved means for effecting the actuation of the said switch.

Generally speaking, one embodiment of my invention comprises an electromagnetic device for operating a reversing-switch included in a circuit operatively distinct from the circuit including the meter-winding, the order of whose connections are controlled by the reversing-switch. The said meter-winding is preferably rotatable, being mounted upon the shaft of the meter, and in wattmeters this movable winding is preferably the pressure-winding.

In wattmeters, the electromagnetic reversing-switch controller is preferably adapted for connection in bridge between the distributing-mains, the said controller preferably having two helices, which are momentarily energized alternately when the armature or rotatable element of the meter reaches the limits of its excursion. For this purpose I preferably provide an arm upon the shaft of the meter, which is preferably electrically connected with one side of the transmission system, the other side of the transmission system having common connection with a terminal of each coil of the electromagnetic controller, the remaining terminals of said coils being in the form of stops placed at the limits of the angular travel of the meter-shaft, so that the said coils are alternately energized. An oscillating armature preferably forms a part of the said electromagnetic controller, this armature controlling a reversing-switch which reverses the connections preferably of the rotatable pressure-winding as the armatures of the controller and meter reach the limits of their excursions. The oscillating armature of the reversing-switch controller is preferably provided with a flexible mounting, preferably in the form of a stem, which forms the connection between the armature and the measuring device, this flexible connection preventing sudden movement of the armature from causing violent movement of parts of the measuring mechanism.

I will explain my invention in all its aspects more fully by reference to the accompanying drawings, illustrating the preferred embodiment thereof, in which—

Figure 1 is an elevation of a meter constructed in accordance with my invention, parts thereof being shown in section, the connections of the meter with a system of distribution being diagrammatically indicated. Fig. 2 is a plan view of the armature of the meters, the current field-coils being shown in section. Fig. 3 is a plan view of the spindle of the meter provided with two contact-making arms, two contact-anvils being also illustrated. Fig. 4 is a plan view of the spindle of the armature provided with a single contact-arm, two contact-anvils being also illustrated. Fig. 5 is a perspective view of the preferred form of reversing-switch entering into my invention.

Like parts are indicated by similar characters of reference throughout the different figures.

In Fig. 1 I have illustrated the application of my invention to the measurement of watts in an alternating-current system of electrical distribution; but I do not wish to be limited to the precise application of the invention there shown. An alternating-current generator 1 is shown in circuit with translating devices 2, the current from the generator being carried to the translating devices by means of mains 3 3. One of the mains includes a series winding comprising in this instance coils 4 4, arranged in series. A shunt-winding, composed of four coils 5 5, is adapted for connection between the sides of the distribution-circuit, as will be more fully hereinafter set forth. The pressure-winding 5 5 is mounted upon a rotatable spindle 6, suitably journaled at its ends and carrying a damping-disk 7 at its lower end, which rotates between the poles of permanent damping-magnets 8 8. The armature is adapted for inclusion in circuit with conductors 9 10 11 12 in bridge of the distributing-mains. The conductors 9 and 10 are united with the distributing-mains and terminate in brushes 13 and 14, while the conductors 11 and 12 terminate in brushes 15 and 16 and are connected with the armature through the agency of coil-springs 17 and 18. The brushes 13 and 14 are constantly in engagement with segmental contacts 19 and 20, respectively. The brushes 15 and 16 are adapted for engagement with contact-segments 21 and 22 or 22 and 21, respectively, according to the position of the contact-segments. These contact-segments are preferably arranged as shown in Fig. 5, the segments being in the form of half-cylinders, the segments of one pair being preferably displaced angularly ninety degrees with respect to the other pair. The contact-segments may be made of silver, nickel, or copper. These segments are relatively immovable and are confined to a range of movement in which the brushes 13 and 14 will maintain constant contact with segments 19 and 20, respectively, while either of the brushes 15 and 16 may make contact with either of the segments 21 and 22. A pinion 23 is mounted upon the spindle carrying the contact-segments, a segmental gear 24 having engagement with the pinion. The segmental gear has an arm 25, preferably flexible, attached thereto, this arm carrying an armature 26 interposed between poles of electromagnets 27 28. A pivot is provided concentric with the segmental gear 24 and located between the same and the armature 26, so that as said armature is moved from side to side the contact-segments will be oscillated, the connections of the armature being reversed upon each oscillation of the contact-segments, which thus constitute a reversing-switch. As the connections of the armature are reversed its direction of rotation is reversed. Stops 29 30 are provided for limiting the rotation of the armature, these stops constituting, respectively, terminals of helices of the magnets 27 28. Contact-arms 31, as shown in Figs. 1 and 3, or a single contact-arm 31, as shown in Fig. 4, may have electrical connection with one of the distributing-mains. As the armature rotates from side to side circuit is alternately made and broken through the magnets 27 and 28, so that the armature 26 is alternately attracted by said magnets to affect the operation of the reversing-switch whereby the reciprocal movements of the armature are effected when it reaches its limits of travel. The arm 25, supporting the armature 26, is preferably slightly flexible to prevent motion from being too positively imparted to the measuring-train 32. A pawl 33 has pivotal connection with the arm supporting the segmental gear 24, and serves, when the said gear is moved in a contraclockwise direction, to rotate the ratchet 34 in a clockwise direction. When the said gear is moved in a clockwise direction, the pawl 33 escapes one tooth of the ratchet, so that when said gear is again moved in a contraclockwise direction the ratchet will be rotated through the space of another tooth. A detent 35 is provided to prevent the ratchet 34 from rotating backward. Resistances 36, 37, and 38 are included in the bridge conductors containing the armature and the electromagnets to prevent waste of current.

I do not wish to be limited to the precise embodiment of my invention herein shown and particularly described; but,

Having thus described my invention, I claim as new, and desire to secure by Letters Patent, the following:

1. In an oscillating meter, the combination with the movable element thereof, of an oscillating circuit-changing switch for changing circuit connections of the meter, a segmental gear, an electromagnetic device for controlling the operation of said circuit-changing switch provided with an armature carrying the said segmental gear, a measuring device actuated by said armature, a pinion carried by the circuit-changing switch in engagement with the said segmental gear, and means controlled by the oscillating member of the meter for governing the operation of the said electromagnetic device, substantially as described.

2. In an oscillating meter, the combination with the movable element thereof, of an oscillating circuit-changing switch for changing circuit connections of the meter comprising four segmental contacts and four brushes engaging the same, two of the said brushes being permanently in contact with two contact-segments, the remaining brushes being adapted to make contact alternately with each of the remaining contact-segments, the latter segments being electrically connected each with one of the aforesaid segments, a pivotally-mounted armature for actuating said circuit-changing switch, and a measuring device actuated thereby, substantially as described.

3. In an oscillating meter, the combination with the movable element thereof, of an oscillating circuit-changing switch for changing the circuit connections of the meter, an electromagnetic device for controlling the operation of said circuit-changing switch, a suitably-mounted armature provided with means for operatively engaging the said oscillatory circuit-changing switch, a measuring device actuated by said armature, and means controlled by said oscillating member of the meter for governing the operation of the said electromagnetic device, substantially as described.

In witness whereof I hereunto subscribe my name this 3d day of March, A. D. 1900.

THOMAS DUNCAN.

Witnesses:
MAX W. ZABEL,
CHARLES E. HUBERT.